(12) United States Patent
Maruyama et al.

(10) Patent No.: US 11,473,552 B2
(45) Date of Patent: Oct. 18, 2022

(54) WAVE POWER GENERATION SYSTEM

(71) Applicants: THE UNIVERSITY OF TOKYO, Tokyo (JP); KAWASAKI JUKOGYO KABUSHIKI KAISHA, Kobe (JP)

(72) Inventors: Koki Maruyama, Tokyo (JP); Chang-Kyu Rheem, Tokyo (JP); Hidetaka Kobayashi, Tokyo (JP); Naoki Kuribayashi, Kobe (JP); Hideki Tanaka, Nishinomiya (JP); Masahide Tsuji, Kobe (JP)

(73) Assignees: THE UNIVERSITY OF TOKYO, Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/254,529

(22) PCT Filed: Feb. 6, 2019

(86) PCT No.: PCT/JP2019/004196
§ 371 (c)(1),
(2) Date: Dec. 21, 2020

(87) PCT Pub. No.: WO2020/026473
PCT Pub. Date: Feb. 6, 2020

(65) Prior Publication Data
US 2021/0270228 A1    Sep. 2, 2021

(30) Foreign Application Priority Data

Aug. 2, 2018   (JP) .............................. JP2018-145791

(51) Int. Cl.
*F03B 13/18*     (2006.01)
*F03B 13/22*     (2006.01)

(52) U.S. Cl.
CPC ............ *F03B 13/182* (2013.01); *F03B 13/22* (2013.01); *F05B 2220/706* (2013.01); *F05B 2240/801* (2013.01); *F05B 2260/232* (2013.01)

(58) Field of Classification Search
CPC .. F03B 13/182; F03B 13/22; F05B 2220/706; F05B 2240/801; F05B 2260/232; F05B 2260/406; Y02E 10/30
(Continued)

(56) References Cited

U.S. PATENT DOCUMENTS

| 4,400,940 A * | 8/1983 | Watabe | ................. F03B 13/182 60/502 |
| 2012/0104752 A1* | 5/2012 | Tsutsumi | .............. F16H 61/421 290/44 |

(Continued)

FOREIGN PATENT DOCUMENTS

| CN | 103403343 A | 11/2013 |
| CN | 204436677 U | 7/2015 |

(Continued)

*Primary Examiner* — Mickey H France
(74) *Attorney, Agent, or Firm* — Oliff PLC

(57) ABSTRACT

A wave power generation system includes: a hydraulic pump device configured to operate by force of a wave to discharge an operating liquid to a main passage; a hydraulic motor device configured to be rotated by the operating liquid flowing through the main passage; a power generator configured to be driven by the hydraulic motor to generate electric power; and a heat exchanger device configured to perform heat exchange of the operating liquid. The heat exchanger device includes a heat exchange motor device connected to the main passage through a sub passage and configured to be operated by the operating liquid introduced through the sub passage, a refrigerant pump device driven by the heat exchange motor device and configured to suck and discharge a refrigerant liquid, and a heat exchanger to which (Continued)

the refrigerant liquid discharged from the heat exchange pump device and the operating liquid are introduced.

8 Claims, 3 Drawing Sheets

(58) Field of Classification Search
USPC .............................. 60/495–507; 290/42, 53
See application file for complete search history.

(56) References Cited

U.S. PATENT DOCUMENTS

| | | |
|---|---|---|
| 2012/0313373 A1 | 12/2012 | Shin et al. |
| 2016/0153422 A1* | 6/2016 | Hench ................ F03B 13/20 60/398 |
| 2018/0266444 A1* | 9/2018 | Futahashi ............ F03B 13/264 |

FOREIGN PATENT DOCUMENTS

| | | | | |
|---|---|---|---|---|
| CN | 204436678 U | | 7/2015 | |
| JP | 59210265 A | * | 11/1984 | ............ F03B 13/142 |
| JP | 2015-108344 A | | 6/2015 | |

\* cited by examiner

WAVE POWER GENERATION SYSTEM

TECHNICAL FIELD

The present invention relates to a wave power generation system configured to generate electric power by utilizing force of waves.

BACKGROUND ART

A wave power generation system is known as one of natural energy power generation systems. The wave power generation system converts wave energy of, for example, sea water, into mechanical energy and further converts the mechanical energy into electric energy.

In a wave power generation system of PTL 1, a pump is driven by the wave energy. An operating liquid discharged from the pump is leveled by an accumulator and then supplied to a hydraulic motor. The hydraulic motor rotates by the supplied operating liquid to drive a power generator. When the operating liquid flows through various components (such as a pump, a motor, and a valve), a pressure loss of the operating liquid occurs, and the temperature of the operating liquid increases due to the pressure loss and the like.

The hydraulic motor discharges the operating liquid to a tank, and the pump sucks the operating liquid from the tank and discharges the operating liquid. Once the wave power generation system starts operating, the operating liquid circulates in the wave power generation system, and the temperature of the operating liquid continuously increases. To solve this problem, the wave power generation system includes an oil cooler. In PTL 1, the oil cooler is of an air cooled type and includes a fan configured to blow outside air to a pipe through which the operating liquid flows.

CITATION LIST

Patent Literature

PTL 1: Japanese Laid-Open Patent Application Publication No. 2015-108344

SUMMARY OF INVENTION

Technical Problem

In PTL 1, the fan is driven by an electric motor, and the operation of the fan is controlled by a controller. Therefore, if electric power cannot be supplied to the controller due to some trouble (such as blackout), the operating liquid may not be cooled. Even in this case, as long as the wave energy is being input, the pump operates, and therefore, the operating liquid continuously circulates. On this account, the temperature of the operating liquid continuously increases due to the loss of a cooling function.

An object of the present invention is to provide a wave power generation system capable of cooling an operating liquid without electric power supply.

Solution to Problem

A wave power generation system of the present invention includes: a hydraulic pump device configured to operate by force of a wave to discharge an operating liquid to a main passage; a hydraulic motor device configured to be rotated by the operating liquid flowing through the main passage; a power generator configured to be driven by the hydraulic motor device to generate electric power; and a heat exchanger device configured to perform heat exchange of the operating liquid. The heat exchanger device includes a heat exchange motor device connected to the main passage through a sub passage and configured to be operated by the operating liquid introduced through the sub passage, a refrigerant pump device driven by the heat exchange motor device and configured to discharge a refrigerant liquid, and a heat exchanger to which the refrigerant liquid discharged from the refrigerant pump device and the operating liquid are introduced, the heat exchanger being configured to perform heat exchange between the refrigerant liquid and the operating liquid to cool the operating liquid.

According to the present invention, part of the operating liquid flowing through the main passage is made to flow to the sub passage to drive the heat exchange motor device. Thus, the refrigerant liquid can be discharged from the refrigerant pump device. The heat exchange motor device is driven by the operating liquid discharged from the hydraulic pump device configured to be operated by the force of the waves. Therefore, the operating liquid can be cooled without electric power supply.

In the above invention, the refrigerant pump device may pump up sea water from the sea and discharge the sea water as the refrigerant liquid.

According to the above configuration, the sea water pumped up from the sea is used as the refrigerant liquid. Therefore, the depletion of the refrigerant liquid can be prevented, and the increase in the temperature of the operating liquid by the depletion of the refrigerant liquid caused due to leakage or the like can be prevented.

In the above invention, the wave power generation system may further include a controller configured to control an operation of the heat exchanger device. The heat exchanger device may include a liquid temperature sensor configured to detect a temperature of the operating liquid and a refrigerant flow regulating valve provided at a refrigerant passage through which the refrigerant liquid discharged from the refrigerant pump device is introduced to the heat exchanger, the refrigerant flow regulating valve being configured to adjust, in accordance with an adjustment command input to the refrigerant flow regulating valve, a flow rate of the refrigerant liquid flowing through the refrigerant passage. The controller may output the command to the refrigerant flow regulating valve based on a detection result of the liquid temperature sensor to adjust the flow rate of the refrigerant liquid flowing through the refrigerant passage.

According to the above configuration, the flow rate of the refrigerant liquid flowing through the heat exchanger can be adjusted based on the detection result of the liquid temperature sensor, and the degree of decrease in the temperature of the operating liquid in the heat exchanger can be adjusted by adjusting the flow rate of the refrigerant liquid. With this, it is possible to prevent a case where the refrigerant liquid is continuously supplied, and this excessively cools the operating liquid. Thus, for example, the operating liquid can be maintained at an appropriate temperature.

In the above invention, the heat exchanger device may further include a refrigerant flow control valve provided at the sub passage and configured to limit the flow rate of the operating liquid flowing through the sub passage to a predetermined flow rate or less.

According to the above configuration, the operating liquid can be made to flow from the main passage to the sub passage at a predetermined flow rate and can be introduced to the heat exchange motor device interposed on the sub passage. In other words, the operating liquid can be prevented from being introduced to the heat exchange motor device at a flow rate that is more than necessary, and the operating liquid flowing through the main passage can be prevented from decreasing significantly.

In the above invention, the heat exchanger may be interposed on a tank passage connecting the hydraulic motor device and a tank.

According to the above configuration, the operating liquid does not flow through the heat exchanger before the operating liquid is introduced to the hydraulic motor device. Thus, the pressure loss of the operating liquid can be suppressed. Therefore, the wave power generation system can be operated efficiently.

Advantageous Effects of Invention

According to the present invention, an operating liquid can be cooled without electric power supply.

DESCRIPTION OF EMBODIMENTS

A wave power generation system 1 according to an embodiment of the present invention will be described with reference to the above drawings. It should be noted that directions stated in the following description are used for convenience sake, and directions and the like of components of the present invention are not limited. Moreover, the wave power generation system 1 described below is just one embodiment of the present invention. Therefore, the present invention is not limited to the embodiment. Additions, deletions, and modifications may be made within the scope of the present invention.

Wave Power Generation System

Figure 1:
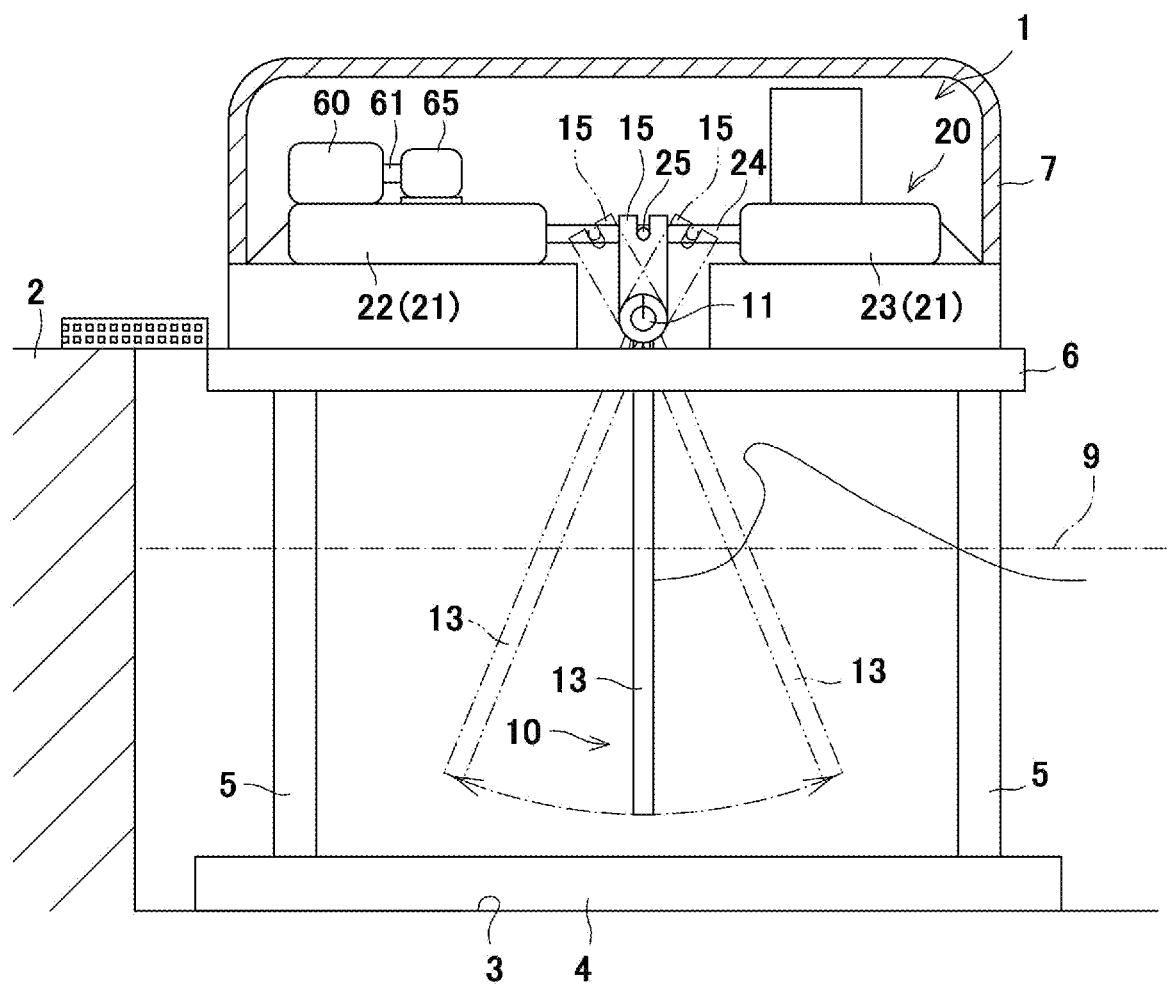
FIG. 1 is a schematic side view of a wave power generation system when viewed from a lateral side.
Figure 2:
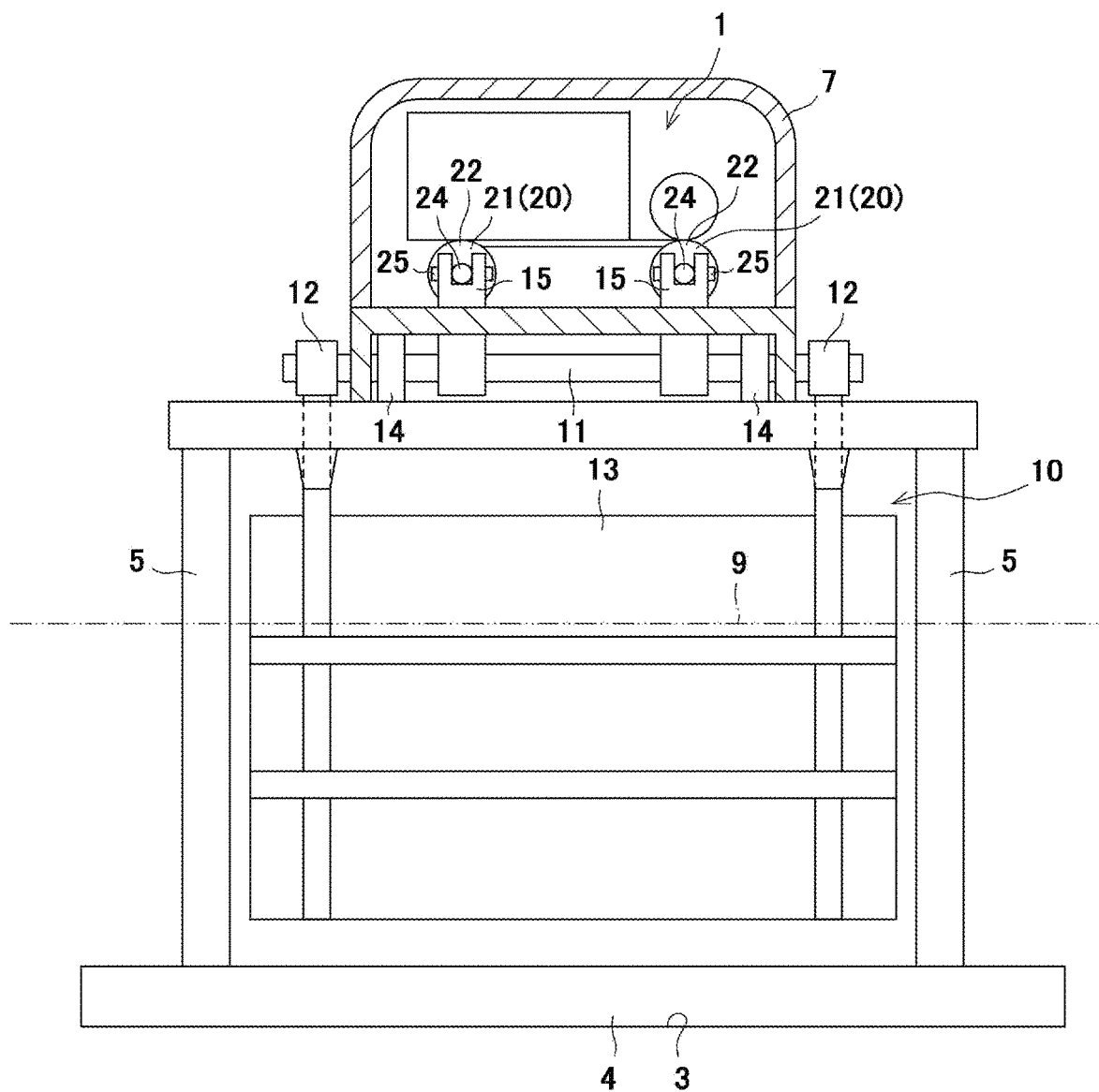
FIG. 2 is a schematic front view of the wave power generation system of FIG. 1 when viewed from front.

The wave power generation system 1 shown in FIG. 1 is a power generation system configured to generate electric power by converting force of waves breaking on a shore, i.e., wave energy into electric energy. The wave power generation system 1 is provided in front of a breakwater 2 provided on a shore. Specifically, a concrete sinker 4 is provided on a seabed 3 in the vicinity of the breakwater 2, and a plurality of (four, for example) posts 5 stand on the concrete sinker 4. A floor panel 6 having a substantially rectangular shape in a plan view is mounted on and fixed to the plurality of posts 5, and the floor panel 6 is covered with a waterproof cover 7. Part of the wave power generation system 1 is accommodated in the waterproof cover 7. As shown in FIGS. 1 and 2, the wave power generation system 1 is configured as a steel marine jacket structure including a pendulum wave receiving mechanism 10.

Wave Receiving Mechanism

The wave receiving mechanism 10 includes a shaft 11, a pair of attaching portions 12, and a wave receiving member 13. The shaft 11 is a shaft extending in a left-right direction in the waterproof cover 7. An intermediate portion of the shaft 11 is supported by a pair of left and right bearing members 14 so as to be turnable. The pair of attaching portions 12 are fixed to both axial end portions of the shaft 11. The attaching portions 12 extend downward from both axial end portions of the shaft 11. The attaching portions 12 pass through grooves (not shown) formed on the floor panel 6 and extend downward beyond the floor panel 6. Lower end portions of the attaching portions 12 are located above a sea surface 9. The wave receiving member 13 is attached to the lower end portions of the pair of attaching portions 12.

The wave receiving member 13 is a plate having a substantially rectangular shape when viewed from front (i.e., from the offing side). Most of the wave receiving member 13 other than its upper portion is located under the sea surface 9. A front surface of the wave receiving member 13 arranged as above receives waves (incident waves) coming from the offing. Moreover, a rear surface of the wave receiving member 13 receives the force of waves (reflected waves) reflected by the breakwater 2 and the vicinity of the breakwater 2. The wave receiving member 13 which has received the force of the waves swings forward and rearward (i.e., toward the offing and the shore) about an axis of the shaft 11. The shaft 11 also turns about the axis together with the wave receiving member 13. A pair of tillers 15 are provided between the pair of bearing members 14 so as to be located away from each other in the left-right direction. The pair of tillers 15 are fixed to the shaft 11 so as to be turnable integrally with the shaft 11 and extend upward from the shaft 11. Moreover, upper end portions of the tillers 15 are coupled to a hydraulic pump device 20 of the wave power generation system 1.

Pump Device

The hydraulic pump device 20 includes a pair of pumps 21. Each of the pumps 21 is a ram cylinder pump and includes a pair of cylinders 22 and 23 and a rod 24. Each of the pair of cylinders 22 and 23 is formed in a substantially bottomed tubular shape. Openings of the pair of cylinders 22 and 23 are opposed to each other. The pair of cylinders 22 and 23 are arranged so as to be spaced apart from each other in a direction along axes of the cylinders 22 and 23 (in the present embodiment, the front-rear direction). One end portion and the other end portion of the rod 24 are inserted into the cylinders 22 and 23. The one end portion and the other end portion of the rod 24 can reciprocate in the cylinders 22 and 23 along the axes of the cylinders 22 and 23.

A pin 25 extending in a direction perpendicular to the axis of the rod 24 (i.e., the left-right direction in the present embodiment) is integrally provided at an axial middle portion of the rod 24. An upper end portion of the tiller 15 is coupled to the pin 25. Therefore, when the tillers 15 swing (see one-dot chain lines and two-dot chain lines in FIG. 1), the rods 24 reciprocate, i.e., the tillers 15 convert a swinging motion of the wave receiving member 13 into reciprocating motions (linear motions) of the rods 24.

Figure 3:
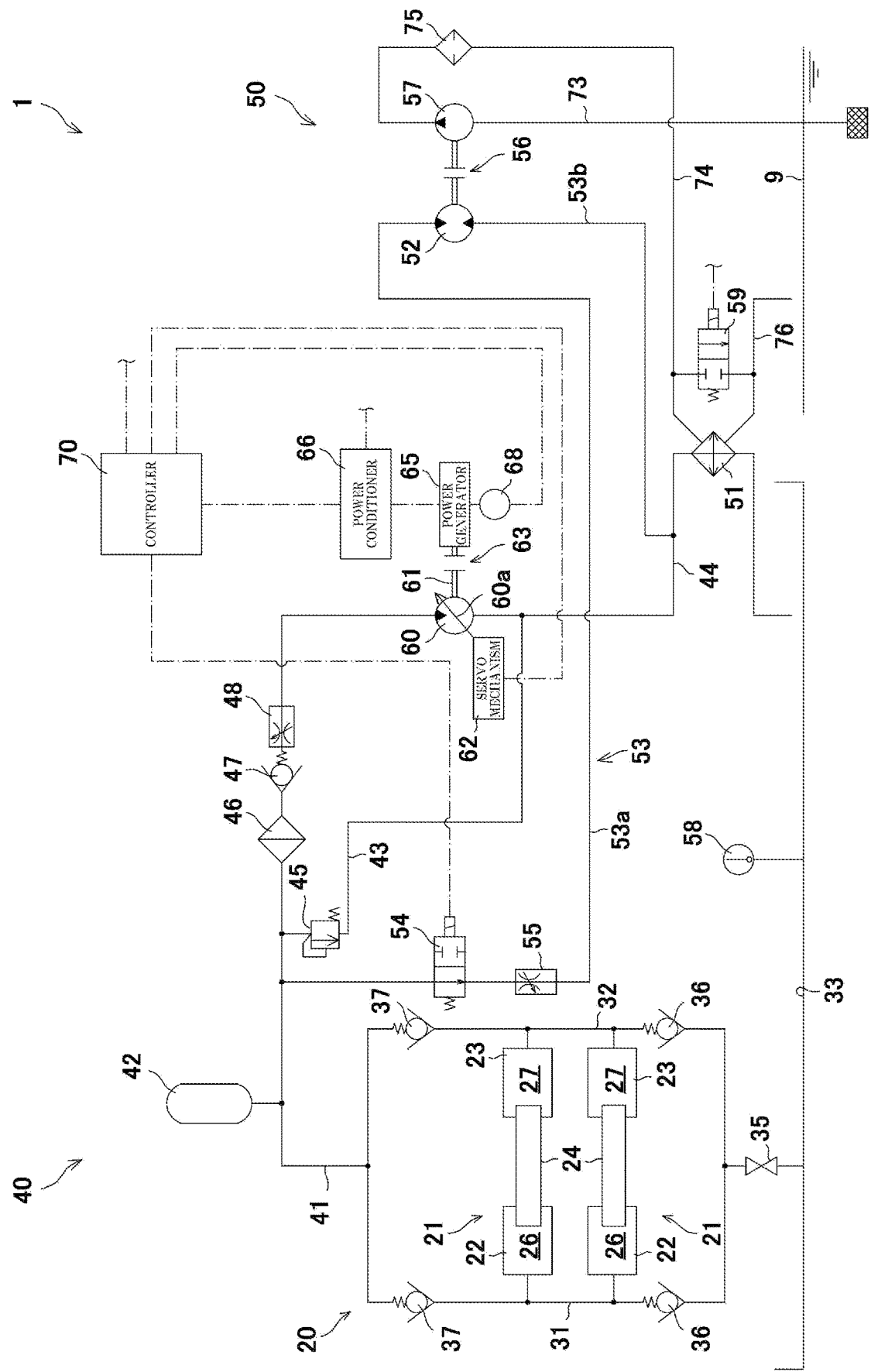
FIG. 3 is a hydraulic circuit diagram showing the configuration of the wave power generation system of FIG. 1.

In the hydraulic pump device 20 configured as above, as shown in FIG. 3, liquid chambers 26 and 27 are formed in the cylinders 22 and 23, respectively. The liquid chambers 26 and 27 are respectively connected to two pump passages 31 and 32 of the hydraulic pump device 20 through ports. To be specific, the first liquid chambers 26 of the pair of pumps 21 are connected to a first pump passage 31, and the second liquid chambers 27 of the pair of pumps 21a are connected to a second pump passage 32. Downstream sides of the two pump passages 31 and 32 are joined to each other, and upstream sides of the two pump passages 31 and 32 are joined to each other. After the upstream sides of the two pump passages 31 and 32 are joined to each other, they are connected to a tank 33 through a main stop valve 35. Moreover, after the downstream sides of the two pump passages 31 and 32 are joined to each other, they are connected to a main passage 41 of a below-described hydraulic drive circuit 40. Furthermore, two check valves 36 and 37 are provided on each of the two pump passages 31 and 32.

In the hydraulic pump device 20 configured as above, when the rod 24 moves toward one side in an axial direction, the operating liquid in the first liquid chamber 26 is discharged to the first pump passage 31, and the discharged operating liquid is introduced through the second check valve 37 to the main passage 41. On the second pump passage 32, the first check valve 36 opens, and the operating liquid is sucked from the tank 33 into the second liquid chamber 27. In contrast, when the rod 24 moves toward the other side in the axial direction, the operating liquid in the second liquid chamber 27 is discharged to the second pump passage 32, and the discharged operating liquid is introduced through the second check valve 37 to the main passage 41. On the first pump passage 31, the first check valve 36 opens, and the operating liquid is sucked from the tank 33 into the first liquid chamber 26. As above, in the hydraulic pump device 20, when the rod 24 reciprocates, the operating liquid having pressure corresponding to the wave energy is discharged to the main passage 41 of the hydraulic drive circuit 40 at a flow rate corresponding to the wave energy.

Hydraulic Drive Circuit

An accumulator 42 is connected to the main passage 41. The accumulator 42 can accumulate the operating liquid under pressure by taking therein the operating liquid flowing through the main passage 41. In the present embodiment, one accumulator 42 is connected to the main passage 41. However, the accumulator 42 may be omitted, or two or more accumulators may be connected to the main passage 41. In this case, it is preferable that pressure-accumulating abilities of the accumulators be different from each other, i.e., accumulable maximum pressure values of the accumulators be different from each other. Moreover, it is preferable that: the accumulators be connected to the main passage 41 through corresponding on-off switching valves; and each of the on-off switching valves switches a connection status between the corresponding accumulator and the main passage 41 by being operated in accordance with the pressure of the operating liquid discharged from the hydraulic pump device 20. A relief passage 43 is connected to a portion of the main passage 41 which portion is located downstream of the accumulator 42.

The relief passage 43 is connected to the tank 33 through a tank passage 44. A relief valve 45 is interposed on the relief passage 43. The relief valve 45 operates when the pressure of the operating liquid flowing through the main passage 41 becomes set relief pressure or more. To be specific, when the pressure of the operating liquid in the main passage 41 becomes the relief pressure or more, the relief valve 45 opens the relief passage 43 to release the operating liquid to the tank 33 and thereby restrict the pressure of the operating liquid in the main passage 41 to the relief pressure or less. As above, the relief valve 45 is connected to the main passage 41 through the relief passage 43, and in parallel with this circuit, a filter 46, a check valve 47, and a flow regulating valve 48 are interposed on the main passage 41 so as to be lined up in this order. In other words, the relief passage 43 branches from a portion of the main passage 41 which portion is located upstream of the filter 46.

The filter 46 removes contaminations and the like of the operating liquid flowing through the main passage 41. The check valve 47 allows the flow of the operating liquid from an upstream side to a downstream side in the main passage 41 and blocks the flow of the operating liquid in the opposite direction. The flow regulating valve 48 is a so-called variable flow restrictor. The flow regulating valve 48 limits the flow rate of the operating liquid flowing therethrough. With this, the flow regulating valve 48 prevents the operating liquid from flowing toward its downstream side at an excessively high flow rate. A hydraulic motor device 60 is further provided downstream of the flow regulating valve 48 having the above function.

Hydraulic Motor

The hydraulic motor device 60 is, for example, a swash plate motor. The hydraulic motor device 60 is driven by the operating liquid, supplied through the main passage 41, to rotate an output shaft 61 of the hydraulic motor device 60. More specifically, the hydraulic motor device 60 rotates the output shaft 61 at a rotational speed corresponding to the flow rate of the supplied operating liquid and a suction volume of the hydraulic motor device 60. After the operating liquid has driven the hydraulic motor device 60, the operating liquid is discharged to the tank passage 44 and then discharged through a below-described heat exchanger 51 to the tank 33.

The hydraulic motor device 60 which operates as above is a so-called variable displacement swash plate motor. By changing a tilting angle of a swash plate 60a of the hydraulic motor device 60, the hydraulic motor 60 can change the suction volume, i.e., can adjust the rotational speed of the output shaft 61. The hydraulic motor device 60 configured as above is provided with a servo mechanism 62 in order to change the tilting angle of the swash plate 60a.

The servo mechanism 62 adjusts the tilting angle of the swash plate 60a by moving a linear motion mechanism (for example, a piston or a ball screw) in accordance with a servo command input to the servo mechanism 62. To be specific, the servo mechanism 62 can adjust the rotational speed of the output shaft 61 by changing the suction volume of the hydraulic motor device 60 in accordance with the servo command input to the servo mechanism 62. A power generator 65 is attached to the output shaft 61 through a coupling 63.

Power Generator

The power generator 65 is a so-called synchronous generator and is constituted by, for example, a permanent magnet generator. The power generator 65 generates AC power (hereinafter may be simply referred to as "electric power") having a frequency corresponding to the rotational speed of the output shaft 61. Therefore, even when the output shaft 61 rotates at a rated rotational frequency (for example, 1,500 rpm or 1,800 rpm) or less, or even when the rotational speed of the output shaft 61 is unstable, the power generator 65 can generate electric power. In the present embodiment, the synchronous generator is adopted as the power generator 65. However, an induction generator may be used as the power generator 65. The power generator 65 configured as above is connected to a power conditioner 66.

The electric power generated at the power generator 65 is transmitted to the power conditioner 66.

Power Conditioner

The power conditioner 66 is connected to an electric power system (not shown). The power conditioner 66 adjusts the voltage and frequency of the electric power such that the voltage and frequency of the electric power become substantially the same as the voltage and frequency of the electric power supplied from a commercial power supply. The power conditioner 66 further adjusts the phase of the electric power and then transmits the electric power to the electric power system. A rotational frequency sensor 68 is provided at the power generator 65. The rotational frequency sensor 68 detects the rotational speed of the output shaft 61, i.e., the rotational frequency of the output shaft 61. The rotational frequency sensor 68 is connected to a controller 70 and outputs a detection result to the controller 70.

Controller

The controller 70 is connected to a control power supply (not shown) and drives by receiving electric power from the control power supply. The controller 70 configured to drive as above is also electrically connected to the servo mechanism 62 and the power conditioner 66. The controller 70 controls the operation of the servo mechanism 62 by outputting a servo command to the servo mechanism 62 based on the detection result of the rotational frequency sensor 68. Moreover, the controller 70 controls the operation of the power conditioner 66 by outputting a drive command to the power conditioner 66. Hereinafter, the operations of the wave power generation system 1 including the control operations of the controller 70 will be described in detail.

Operations of Wave Power Generation System

In the wave power generation system 1, when the wave receiving member 13 swings by receiving the force of the waves, the shaft 11 turns, and the operating liquid is discharged from the hydraulic pump device 20 to the main passage 41. Since the hydraulic pump device 20 is a ram cylinder pump, the flow (flow rate and pressure) of the operating liquid discharged from the hydraulic pump device 20 pulsates. Therefore, the accumulator 42 levels the pulsating flow of the operating liquid by accumulating the operating liquid (i.e., accumulating the operating liquid under pressure) in accordance with the pressure of the operating liquid flowing through the main passage 41 or discharging the accumulated operating liquid. To be specific, the flow rate and pressure of the operating liquid flowing through the main passage 41 can be made substantially constant. The operating liquid whose flow rate and pressure have been made constant flows through the filter 46 and the check valve 47, and then, the flow regulating valve 48 reduces the flow rate of the operating liquid. After that, the operating liquid is introduced to the hydraulic motor device 60. The hydraulic motor device 60 rotates the output shaft 61 by the introduced operating liquid to drive the power generator 65. At this time, the rotational speed of the output shaft 61 is detected by the rotational frequency sensor 68, and the detection result is output from the rotational frequency sensor 68 to the controller 70.

The controller 70 controls the operation of the servo mechanism 62 based on the detection result of the rotational frequency sensor 68. To be specific, the controller 70 adjusts the tilting angle of the swash plate 60*a* based on the detection result of the rotational frequency sensor 68, and with this, maintains the rotational frequency of the output shaft 61 within a predetermined range (for example, the above-described rated rotational frequency and values therearound). Thus, the power generator 65 can be rotated at a constant speed, and the frequency of the electric power generated by the power generator 65 can be adjusted to a constant value. To be specific, the electric power having a stable frequency can be output from the power generator 65. The electric power output as above can be transmitted from the power generator 65 to the power conditioner 66. The controller 70 controls the operation of the power conditioner 66 to adjust the voltage, frequency, and phase of the electric power, mainly supplied to the electric power system, to values (or ranges) required when the power conditioner 66 is connected to the electric power system. With this, the electric power can be transmitted from the power conditioner 66 to the electric power system.

In the wave power generation system 1, after the operating liquid introduced to the hydraulic motor device 60 drives, i.e., rotates the hydraulic motor device 60, the operating liquid is discharged to the tank passage 44 and is then returned to the tank 33 through the tank passage 44. The operating liquid which has returned to the tank 33 is again sucked by the hydraulic pump device 20. Then, the operating liquid flows through various devices, drives the hydraulic motor device 60, and is again discharged to the tank 33. As above, the operating liquid circulates in the wave power generation system 1. When the circulating operating liquid flows through the hydraulic pump device 20, the flow regulating valve 48, and the hydraulic motor device 60, a pressure loss of the operating liquid occurs. Due to the pressure loss and the like, the temperature of the operating liquid increases. Since the temperature of the operating liquid continuously increases by the circulation, the wave power generation system 1 includes a heat exchanger device 50 in order to suppress the increase in the temperature of the operating liquid.

Heat Exchanger Device

The heat exchanger device 50 performs heat exchange between a refrigerant liquid (in the present embodiment, sea water) and the operating liquid to cool the operating liquid. The heat exchanger device 50 includes a heat exchange motor device 52. The heat exchange motor device 52 is interposed on a sub passage 53 which branches from the main passage 41 and is joined to the tank passage 44. The sub passage 53 is constituted by a supply passage 53*a* and a discharge passage 53*b*. The supply passage 53*a* branches from the main passage 41 and is connected to an inlet of the heat exchange motor device 52. The discharge passage 53*b* is connected to an outlet of the heat exchange motor device 52 and is joined to the tank passage 44. In other words, the heat exchange motor device 52 is connected to the main passage 41 through the sub passage 53. The sub passage 53 (especially, the supply passage 53*a*) is connected to a portion of the main passage 41 which portion is located between the hydraulic pump device 20 and the hydraulic motor device 60. More specifically, the sub passage 53 (supply passage 53*a*) is connected to a portion of the main passage 41 which portion is located between the accumulator 42 and the relief passage 43. The sub passage 53 (supply passage 53*a*) introduces the operating liquid, flowing through the main passage 41, to the heat exchange motor device 52.

A switching valve 54 and a heat exchange flow control valve 55 are interposed on the sub passage 53 (supply passage 53a) so as to be lined up in this order from an upstream side that is the main passage 41 side. The switching valve 54 is a so-called normally open electromagnetic on-off valve and is electrically connected to the controller 70. To be specific, the switching valve 54 normally opens the sub passage 53 to introduce the operating liquid to the heat exchange flow control valve 55. The heat exchange flow control valve 55 is a so-called variable flow restrictor. The heat exchange flow control valve 55 limits the flow rate of the operating liquid flowing therethrough. With this, the operating liquid can be made to flow from the main passage 41 to the sub passage 53 at a predetermined flow rate and can be then introduced to the heat exchange motor device 52. With this, the operating liquid can be prevented from being introduced to the heat exchange motor device 52 at a flow rate that is more than necessary, and the operating liquid flowing through the main passage 41 can be prevented from decreasing significantly.

The heat exchange motor device 52 is a so-called fixed displacement hydraulic motor and is, for example, a gear motor. To be specific, the heat exchange motor device 52 is driven by the operating liquid, supplied through the sub passage 53, to rotate an output shaft 52a of the heat exchange motor device 52. A refrigerant pump device 57 is coupled to the output shaft 52a through a coupling 56. The refrigerant pump device 57 is a so-called fixed displacement hydraulic pump and is, for example, a centrifugal pump. The refrigerant pump device 57 is connected to the sea through a suction passage 73 and also connected to the heat exchanger 51 through a supply passage 74. The refrigerant pump device 57 operates by the rotation of the output shaft 52a. With this, the refrigerant pump device 57 pumps up the sea water as the refrigerant liquid from the sea through the suction passage 73 and discharges the sea water to the supply passage 74. A filter 75 is interposed on a portion of the supply passage 74. The filter 75 removes contaminations and the like contained in the discharged sea water. Further, as described above, the heat exchanger 51 is connected to the supply passage 74 so as to be located downstream of the filter 75.

The heat exchanger 51 is connected to the supply passage 74 and is interposed on the tank passage 44. The heat exchanger 51 performs heat exchange between the operating liquid flowing through the tank passage 44 and the sea water introduced through the supply passage 74. For example, the heat exchanger 51 includes a pipe connected to the tank passage 44, and the pipe is arranged so as to extend inside the sea water introduced from the supply passage 74. With this, the heat exchanger 51 can cool the operating liquid by performing the heat exchange between the operating liquid and the sea water through the pipe. The heat exchanger 51 having the above function is further connected to a discharge passage 76. The sea water introduced through the supply passage 74 is discharged to the sea through the discharge passage 76.

The heat exchanger device 50 configured as above pumps up the sea water as the refrigerant liquid from the sea, cools the operating liquid, discharges the sea water to the sea, and again pumps up the new sea water. Therefore, the low-temperature sea water can be introduced to the heat exchanger 51 at all times. Thus, the increase in the temperature of the operating liquid can be effectively suppressed. Since the sea water is pumped up from the sea and used as the refrigerant liquid, the depletion of the refrigerant liquid due to leakage or the like can be prevented, and the increase in the temperature of the operating liquid due to the depletion of the refrigerant liquid can be prevented.

In order to prevent the operating liquid flowing through the tank passage 44 from being excessively cooled, the heat exchanger device 50 includes a liquid temperature sensor 58 and a refrigerant flow regulating valve 59. The liquid temperature sensor 58 is provided at, for example, the tank 33 and detects the temperature of the operating liquid in the tank 33. The liquid temperature sensor 58 is electrically connected to the controller 70. The controller 70 acquires the temperature of the operating liquid in the tank 33 based on the detection result of the liquid temperature sensor 58. Moreover, the controller 70 controls the operation of the refrigerant flow regulating valve 59 based on the acquired temperature of the operating liquid.

The refrigerant flow regulating valve 59 is a so-called normally closed electromagnetic on-off valve and is connected to the supply passage 74 and the discharge passage 76 so as to bypass. The refrigerant flow regulating valve 59 is electrically connected to the controller 70 and makes the supply passage 74 and the discharge passage 76 communicate with each other based on a command from the controller 70. With this, at least a part of the sea water flowing through the supply passage 74 can be directly introduced to the discharge passage 76 and then discharged without flowing through the heat exchanger 51, and the amount of sea water flowing through the heat exchanger 51 can be reduced. To be specific, the flow rate of the sea water flowing through the heat exchanger 51 can be adjusted by the refrigerant flow regulating valve 59, and therefore, the degree of decrease in the temperature of the operating liquid in the heat exchanger 51 can be adjusted. With this, it is possible to prevent a case where the sea water lower in temperature than the operating liquid is continuously supplied, and this excessively cools the operating liquid. Thus, the operating liquid can be maintained at an appropriate temperature.

In the heat exchanger device 50, the discharge passage 53b of the sub passage 53 is connected to the tank passage 44, and the operating liquid flowing through the sub passage 53 is discharged to the tank 33 through the tank passage 44. The sub passage 53 (discharge passage 53b) is connected to a portion of the tank passage 44 which portion is located upstream of the heat exchanger 51, and therefore, the operating liquid discharged from the heat exchange motor device 52 is also subjected to the heat exchange in the heat exchanger 51 and then discharged to the tank 33. On this account, since the operating liquid which has been increased in temperature in order to drive the heat exchange motor device 52 is also cooled by the heat exchanger 51, the increase in the temperature of the operating liquid in the tank 33 can be suppressed. Furthermore, the pressure loss caused by the heat exchanger 51 before the operating liquid is introduced to the hydraulic motor device 60 can be suppressed. Therefore, the wave power generation system 1 can be made to operate efficiently.

In the heat exchanger device 50 configured as above, when the switching valve 54 opens the sub passage 53, part of the operating liquid flowing through the main passage 41 is introduced to the heat exchange motor device 52 to drive the heat exchange motor device 52. With this, the refrigerant pump device 57 can pump up the sea water through the suction passage 73 and supply the sea water through the supply passage 74 to the heat exchanger 51. With this, the heat exchange between the operating liquid and the sea water can be performed in the heat exchanger 51, and thus, the operating liquid flowing through the tank passage 44 can be cooled. As above, according to the heat exchanger device 50, the heat exchange motor device 52 can be driven by the operating liquid flowing from the main passage 41 to the sub passage 53, and thus, the sea water can be supplied to the heat exchanger 51. Therefore, when the operating liquid is flowing through the main passage 41, and the sub passage 53 is open, the sea water can be supplied to the heat exchanger 51 regardless of the operation of the controller 70, and therefore, the operating liquid can be cooled.

For example, in some cases, electric power cannot be supplied from the control power supply to the controller 70 due to blackout or the like, and this may stop the controller 70. Even in such cases, as long as there are waves, the wave receiving member 13 swings by the force of the waves, and with this, the operating liquid is discharged from the hydraulic pump device 20 to the main passage 41. Therefore, as long as there are waves, the operating liquid is flowing through the main passage 41. By making part of the operating liquid flow to the sub passage 53 and introducing the operating liquid to the heat exchange motor device 52, the heat exchange motor device 52 can be operated. To be specific, the heat exchange motor device 52 can be operated without the control operation performed by the controller 70. Therefore, even after electric power supply to the controller 70 is stopped, and this stops the controller 70, the operating liquid can be continuously cooled. It should be noted that when the temperature of the operating liquid is excessively low, the operation of the heat exchanger device 50 may be stopped by actively closing the switching valve 54. By making the operating liquid circulate in the system without cooling the operating liquid, the temperature of the operating liquid can be increased to an appropriate range Other Embodiments In the wave power generation system 1 of the present embodiment, the pair of pumps 21 are lined up in the left-right direction in a plan view. However, the direction in which the pair of pumps 21 are lined up is not necessarily limited to the left-right direction. The pair of pumps 21 may be lined up in the upper-lower direction or may be lined up in the front-rear direction. In the wave power generation system 1, the heat exchange flow regulating valve 59 is connected to the supply passage 74 and the discharge passage 76 so as to bypass the heat exchanger 51, but does not necessarily have to be provided. Moreover, the sea water is used as the refrigerant liquid. However, the refrigerant liquid does not necessarily have to be the sea water and may be fresh water or oil.

In the wave power generation system 1 of the present embodiment, the heat exchanger 51 is interposed on the tank passage 44. However, the heat exchanger 51 does not necessarily have to be interposed at this position. To be specific, the heat exchanger 51 may be interposed on the main passage 41. As long as the heat exchanger 51 can cool the operating liquid to be returned to the tank 33, the heat exchanger 51 may be provided at any position.

REFERENCE SIGNS LIST 1 wave power generation system
20 hydraulic pump device
33 tank
41 main passage
44 tank passage
50 heat exchanger device
51 heat exchanger
52 heat exchange motor device
53 sub passage
55 heat exchange flow regulating valve
57 refrigerant pump device
58 liquid temperature sensor
59 refrigerant flow regulating valve
60 hydraulic motor device
65 power generator
70 controller
74 supply passage (refrigerant passage)

The invention claimed is:

1. A wave power generation system comprising:
a hydraulic pump device configured to operate by force of a wave to discharge an operating liquid to a main passage;
a hydraulic motor device configured to be rotated by the operating liquid flowing through the main passage;
a power generator configured to be driven by the hydraulic motor device to generate electric power; and
a heat exchanger device configured to perform heat exchange of the operating liquid, wherein
the heat exchanger device includes
a heat exchange motor device connected to the main passage through a sub passage and configured to be operated by the operating liquid introduced through the sub passage,
a refrigerant pump device driven by the heat exchange motor device and configured to pump up sea water from the sea and discharge the sea water as a refrigerant liquid, and
a heat exchanger to which the refrigerant liquid discharged from the refrigerant pump device and the operating liquid are introduced, the heat exchanger being configured to perform heat exchange between the refrigerant liquid and the operating liquid to cool the operating liquid.

2. The wave power generation system according to claim 1, further comprising a controller configured to control an operation of the heat exchanger device, wherein:
the heat exchanger device includes
a liquid temperature sensor configured to detect a temperature of the operating liquid and
a refrigerant flow regulating valve provided at a refrigerant passage through which the refrigerant liquid discharged from the refrigerant pump device is introduced to the heat exchanger, the refrigerant flow regulating valve being configured to adjust, in accordance with an adjustment command input to the refrigerant flow regulating valve, a flow rate of the refrigerant liquid flowing through the refrigerant passage; and
the controller outputs the command to the refrigerant flow regulating valve based on a detection result of the liquid temperature sensor to adjust the flow rate of the refrigerant liquid flowing through the refrigerant passage.

3. The wave power generation system according to claim 1, wherein the heat exchanger device further includes a heat exchange flow control valve provided at the sub passage and configured to limit the flow rate of the operating liquid flowing through the sub passage to a predetermined flow rate or less.

4. The wave power generation system according to claim 1, wherein the heat exchanger is interposed on a tank passage connecting the hydraulic motor device and a tank.

5. The wave power generation system according to claim 2, wherein the heat exchanger device further includes a heat exchange flow control valve provided at the sub passage and configured to limit the flow rate of the operating liquid flowing through the sub passage to a predetermined flow rate or less.

6. The wave power generation system according to claim 2, wherein the heat exchanger is interposed on a tank passage connecting the hydraulic motor device and a tank.

7. The wave power generation system according to claim 3, wherein the heat exchanger is interposed on a tank passage connecting the hydraulic motor device and a tank.

8. The wave power generation system according to claim 5, wherein the heat exchanger is interposed on a tank passage connecting the hydraulic motor device and a tank.

* * * * *